United States Patent [19]

Boskovic

[11] Patent Number: 4,842,508

[45] Date of Patent: Jun. 27, 1989

[54] CORE INSERT ACTUATOR

[76] Inventor: Borislav Boskovic, 2102 Bannockburn, Inverness, Ill. 60067

[21] Appl. No.: 232,276

[22] Filed: Aug. 15, 1988

[51] Int. Cl.$^4$ .................................... B29C 45/36
[52] U.S. Cl. .................................... 425/468; 425/577; 425/DIG. 10; 249/63; 249/142; 249/151; 264/334
[58] Field of Search .......................... 249/63, 151–153, 249/117, 142–144, 181–182, 184, 145–150, 152, 59, 52, 64, 67, 68, 178; 425/414, 468, DIG. 10, 577, 438, 575, 589, 554, 562, 565, 566, 466, 467, DIG. 227, DIG. 243, DIG. 247; 251/161, 266; 264/154, 334

[56] References Cited

U.S. PATENT DOCUMENTS

| | | | |
|---|---|---|---|
| 1,519,446 | 12/1924 | Flowers | 251/266 |
| 3,123,864 | 3/1964 | MacIntyre | 425/575 |
| 3,387,323 | 6/1968 | Wyllie et al. | 249/63 |
| 4,199,316 | 4/1980 | Bradbury | 425/577 |
| 4,231,440 | 11/1980 | Erwin | 251/161 |
| 4,274,617 | 6/1981 | Schriever | 249/63 |
| 4,452,420 | 6/1984 | Lundquist | 425/577 |

FOREIGN PATENT DOCUMENTS

| | | | |
|---|---|---|---|
| 46-29984 | 8/1971 | Japan | 249/59 |
| 62-225316 | 10/1987 | Japan | 425/468 |

OTHER PUBLICATIONS

Brochure–AWE Locking Cylinder, Brandts Dist. Ltd., 1986.
Brochure–Wedge Lock Actuators, Stilson Company.

Primary Examiner—Jay H. Woo
Assistant Examiner—Mathieu Vargot
Attorney, Agent, or Firm—Lee & Smith

[57] ABSTRACT

A device for inserting and withdrawing a core in plastic and die cast molds. A rotatable cylindrical nut is located within the hollow cylindrical interior of a support housing. The nut has a threaded inner cavity. A non-rotatable slide extends through an aperture in the housing, the slide having a threaded end engaging the threaded inner cavity. When the nut is rotated, the slide is either extended or retracted through the aperture depending on the direction of rotation of the nut. A mold core is affixed to the slide for insertion into and withdrawal of the core from the mold.

6 Claims, 1 Drawing Sheet

CORE INSERT ACTUATOR

BACKGROUND OF THE INVENTION

This invention relates to plastic injection and die cast molding, and in particular to a device for operating with a mold to form voids in a molded part.

Often, when a plastic part is formed in a plastic injection molding or die cast molding machine, holes are required, such as holes for radio knobs or the like. The mold must have a part that is withdrawn from the mold after the part has been molded to allow the part to be removed from the mold. Thus, various devices have been developed to pneumatically or hydraulically operate a mold core device which inserts or removes a core to form the necessary voids. For example, the Stilson Company has developed a device called "Wedge Lock Actuator", which has a cylinder which is driven back and forth to insert and withdraw a slide, and attached core, from a mold. Another device, known as the Brants AWE System is similar, having a central piston which extends and retracts a mold core attached to a slide extending from the piston.

U.S. Pat. No. 4,199,316 and 4,274,617 disclose other types of devices for inserting and retracting mold cores. The former patent utilizes a series of springs to retract the core, while the latter patent utilizes a complex rack arrangement to insert and retract the core. Such devices are complex, and due to their complexity, are prone to failure or improper operation.

SUMMARY OF THE INVENTION

The present invention is directed to a simple device for inserting and withdrawing a core in a plastic injection or die cast mold. The invention includes a housing having a hollow cylindrical interior, and a rotatable cylindrical nut, which conforms to the cylindrical interior, and which is captured within that interior. The nut has a threaded inner cavity, and an aperture is formed in the housing in axial alignment with the inner cavity. A non-rotatable slide has a portion extending from the housing through the aperture, the slide also having a threaded end which engages the threaded inner cavity of the nut. Means is provided for preventing rotation of the slide in the aperture. Means is also provided for rotating the nut to either extend or retract the slide through the aperture to insert or withdraw a core in the mold.

In accordance with the preferred form of the invention, the aperture is square and the portion of the slide extending through the aperture is square in cross section, and conforms to the aperture. The square aperture and the square portion of the slide comprise the means for preventing rotation of the slide.

A bi-directional rotary actuator is provided for rotating the nut. The actuator is appropriately secured to the nut for its rotation. In accordance with the preferred form of the invention, the actuator has a shaft extending into, and secured to, a socket formed in the nut. Preferably, the shaft has a longitudinal keyway and the nut includes a key formed in the socket for engaging the keyway to effect a direct coupling between the shaft and the nut.

BRIEF DESCRIPTION OF THE DRAWING

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
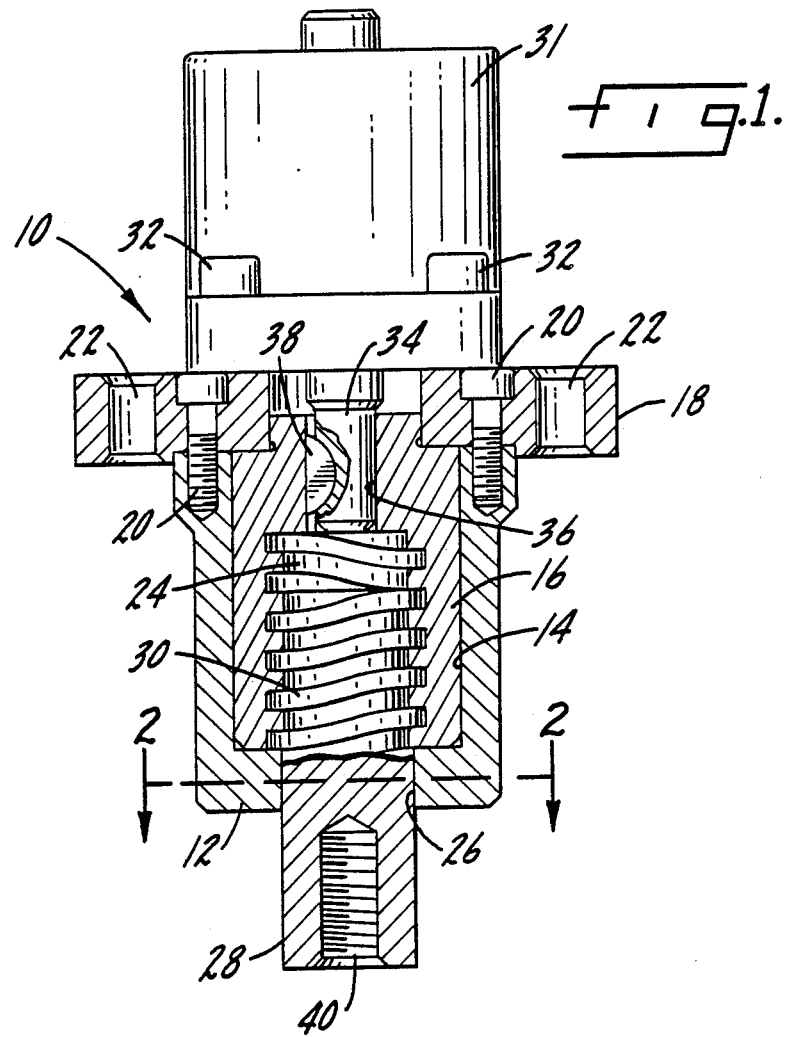
FIG. 1 is an elevational view, partly in cross section, of the actuator device according to the invention.

The mold core inserting device according to the invention is shown generally at 10 in the drawing figures. It includes a housing 12 having a hollow, cylindrical interior 14 in which a rotatable cylindrical nut 16 is located. As illustrated, the nut 16 conforms to and is captured within the interior 14 by means of a flanged cover 18 which is secured to the housing 12 by means of a series of screws 20. The cover 18 includes a series of apertures 22 to permit the device 10 to be secured to a mold by means of screws, bolts or the like.

Figure 2:
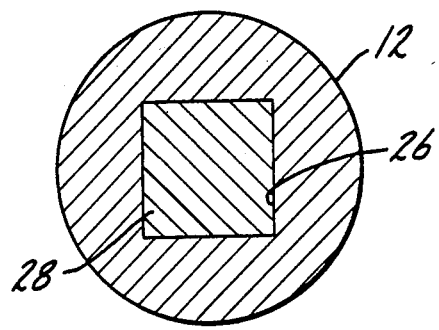
FIG. 2 is a cross-sectional view taken along lines 2—2 of FIG. 1.

The nut 16 has a threaded inner cavity 24 formed along the majority of the axial length thereof. The housing 12 has a square aperture 26, formed therein in axial alignment with the inner cavity 24. A non-rotatable slide 28 extends from the housing 12 through the aperture 26, the cross section of the slide in the aperture 26 being square, as shown in FIG. 2.

The slide 28 includes a series of threads 30 which engage the threads of the cavity 24. When the nut 16 is rotated, the slide 28 is either extended from or retracted through the aperture 26, depending on the direction of rotation of the nut 16.

A rotary actuator 31 is provided for rotation of the nut 16. The actuator 31 may be any conventional rotary actuator, such as any one of the Rotac rotary actuators of the Ex-Cell-O Corporation. The Rotac actuator is fluid actuated, and can be configured to rotate the nut through any arc less than 360 degrees.

The actuator 31 is secured to the flanged cover 18 by means of a series of screws 32. The actuator 31 includes a central shaft 34 which extends downwardly into a socket 36 formed in the top of the nut 16. The nut 16 includes a protruding key 38 in the socket 36 which engages a keyway formed in the shaft 34. Thus, when the shaft 34 is rotated, direct mechanical interconnection by means of the key 38 causes rotation of the nut 16.

A mold core (not illustrated) is secured to the bottom of the slide 28 in a threaded aperture 40. The core is conventional and may be configured as desired to form a required hole or gap in the plastic part being created in the mold (also not illustrated).

The actuator device 10 functions quite simply. When the mold is opened, the slide 28 is retracted into the nut 16 to a desired amount. When the mold is closed, but before or during the time that injection of plastic into the mold, the actuator 31 is actuated to rotate the nut, therefore extending the slide 28 therefrom, and the core into the mold. After the mold has been filled with plastic, but before or during the time that the jaws of the mold are opened, the actuator 31 is activated to rotate the nut 16 in the opposite direction to retract the slide 28 into the nut 16, thus withdrawing the core either wholly or partially from the mold. At that time, the molded plastic part can be removed from the mold without damage.

Various changes can be made to the invention without departing from the spirit thereof or scope of the following claims.

What is claimed is:

1. A device for inserting and withdrawing a core in a plastic mold to create a void in a molded plastic article, comprising
   a. a housing having a hollow cylindrical interior,
   b. a rotatable cylindrical nut conforming to and captured within said interior, said nut having a threaded inner cavity,
   c. an aperture in said housing in axial alignment with said inner cavity,
   d. a non-rotatable elongated slide having a portion extending from said housing through said aperture, said slide having a threaded end engaging said threaded inner cavity,
   e. means for preventing rotation of said slide relative to said housing, and
   f. means for rotating said nut to axially extend and retract said slide through said aperture.

2. A device according to claim 1 in which said aperture is square and said portion of said slide is square in cross section and conforms to said aperture, said means for preventing rotation comprising said square aperture and square portion of said slide.

3. A device according to claim 1 in which said means for rotating comprises a bi-directional rotary actuator, and means connecting said actuator to said nut.

4. A device according to claim 3 in which said means connecting comprises a shaft extending from said actuator into a socket formed in said nut, said shaft having a keyway and said nut including a key in said socket engaging said keyway.

5. A device according to claim 3 in which said means connecting comprises a shaft extending from said actuator into, and secured to, a socket formed in said nut.

6. A device according to claim 1 including means for mounting said housing on a plastic mold.

* * * * *